United States Patent [19]
Watts

[11] Patent Number: 5,249,868
[45] Date of Patent: Oct. 5, 1993

[54] TRACK BUSHING

[75] Inventor: Kenneth R. Watts, Peoria, Ill.

[73] Assignee: Caterpillar Inc., Peoria, Ill.

[21] Appl. No.: 9,699

[22] Filed: Jan. 27, 1993

[51] Int. Cl.⁵ .................... F16C 33/12; B62D 55/205; C21D 1/04
[52] U.S. Cl. .................... 384/276; 384/625; 305/58 R; 148/570
[58] Field of Search .......... 384/276, 418, 625; 148/319, 570, 639; 305/58 R, 59, 58 PC

[56] References Cited

U.S. PATENT DOCUMENTS

| | | | |
|---|---|---|---|
| 2,730,472 | 1/1956 | Osborn, Jr. | 148/570 |
| 3,071,981 | 1/1963 | Kuntzmann | 384/625 X |
| 3,227,586 | 1/1966 | Spencer | 148/319 |
| 3,567,529 | 3/1971 | Burtnett | 148/571 |
| 3,762,778 | 10/1973 | Boggs et al. | 305/14 |
| 4,639,995 | 2/1987 | Garman et al. | 29/402.08 |
| 4,916,981 | 4/1990 | Suzuki et al. | 384/625 X |
| 5,049,207 | 9/1991 | Sahara et al. | 148/503 |

Primary Examiner—Thomas R. Hannon
Attorney, Agent, or Firm—Kenneth A. Rhoads

[57] ABSTRACT

The invention relates to a track bushing having an outer peripheral surface, an inner peripheral surface, a longitudinal bore, first and second end portions, and a center portion. The outer peripheral surface and the inner end portions have a preselected hardness greater than the center portion.

6 Claims, 1 Drawing Sheet

# TRACK BUSHING

DESCRIPTION

1. Technical Field

This patent relates to a track bushing and more particularly to a hardened track bushing having preselected areas of hardness.

2. Background Art

Endless track assemblies for crawler-type construction equipment include a plurality of spaced co-acting track links with laterally overlapping ends joined by track bushings and track pins. Conventionally, the pins are coaxially disposed within the track bushings and rotate or pivot within the bushings. Examples of this type of endless track assembly is disclosed in U.S. Pat. No. 4,639,995 issued Feb. 3, 1987 to Garman et al., and U.S. Pat. No. 3,762,778 issued Oct. 2, 1973 to Boggs et al.

The main cause of damage to the track bushings are wear and fatigue cracks. Wear also results from the harsh contaminated environments in which the track assembly works. In an effort to increase bushing life, the outer and inner peripheral surfaces are hardened to resist wear. The heat treatment applied for a conventional bushing has been gas carburizing, quenching, and tempering. A typical example of this type of process is illustrated in U.S. Pat. No. 3,567,529 issued to R. D. Burtnett on Mar. 2, 1971.

Different areas of the bushing have varying functional requirements. The outer peripheral surface of the bushing requires a high hardness and a deep hardened depth because it is the surface that engages with the sprocket for driving of the track. The center of the inner peripheral surface of the bushing requires high fatigue resistance because of stresses created by the load transfer path from the sprocket into the bushing. The end portions of the inner peripheral surface require high surface hardness because of high stress caused by contact between the bushing and the pin.

Therefore, it is desirable to harden only selective portions of the track bushing in order to provide a longer lived bushing and, in the treating process, avoid the waste of time, material and resources. The present invention is directed to overcome one or more of the problems as set forth above.

DISCLOSURE OF THE INVENTION

In one aspect of the invention, a hardened track bushing for track of a work vehicle includes an outer peripheral surface and an inner peripheral surface, first and second end portions, a center portion, and a bore opening on each end. The outer peripheral surface has a Rockwell C hardness in the range of about 57 to about 62, the inner peripheral surface has a Rockwell C hardness on the first and second end portions in the range of about 57 to about 62 and a Rockwell C hardness on the center portion in the range of about 15 to about 50.

BEST MODE FOR CARRYING OUT THE INVENTION

Figure 1:
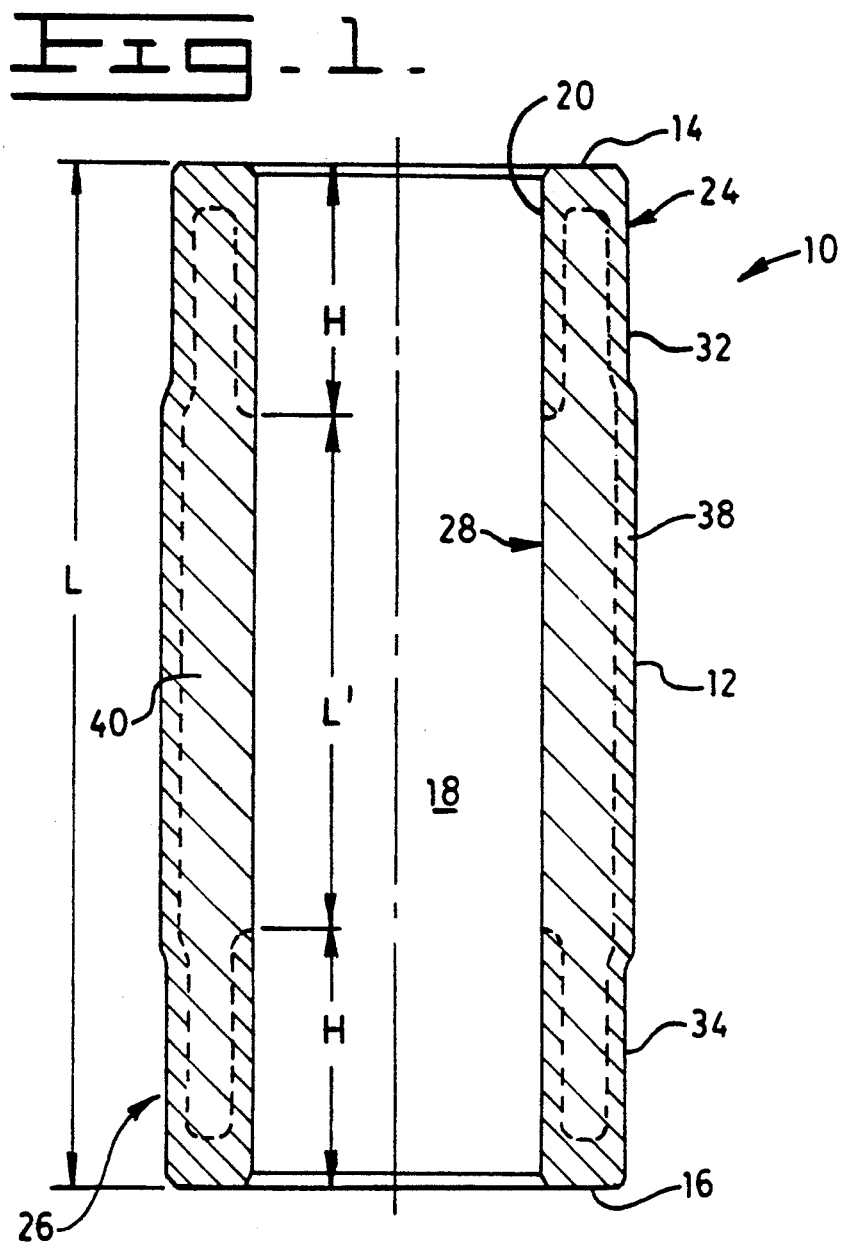
FIG. 1 is a diagrammatic axially sectioned view of a direct hardened track bushing formed in according to the present invention.
Figure 2:
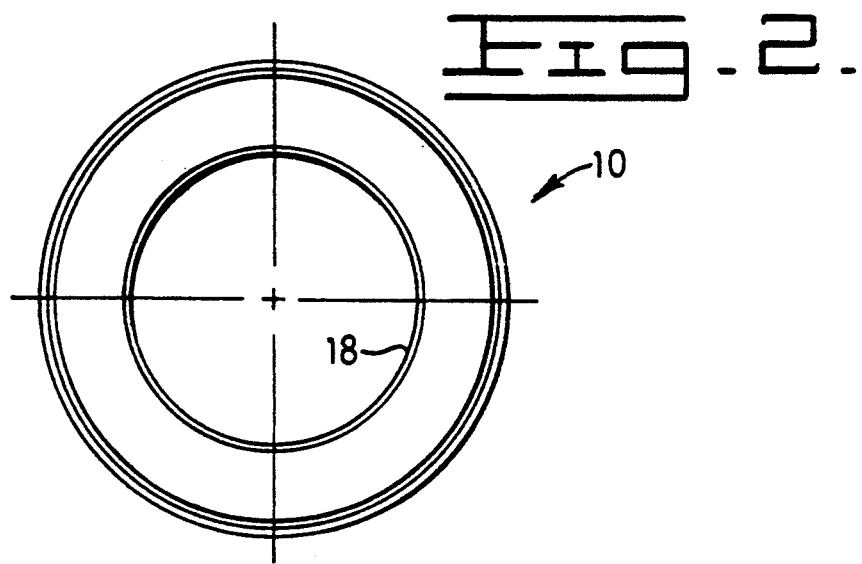
FIG. 2 is a diagrammatic end view of the track bushing.

Referring to FIGS. 1 and 2, a hardened track bushing 10 is illustrated for use in the endless track of a work vehicle such as, for example, track type tractors. The track bushing 10 is formed in a generally cylindrical shape having an outer peripheral surface 12 extending generally the full length of the bushing, a pair of radial end surfaces 14 and 16, and a longitudinal bore 18. An inner peripheral surface 20 opens on each of the radial end surfaces 14 and 16 and defines the bore 18. The bushing 10 further defines first and second end portions 24 and 26 and a center portion 28. The bushing 10 has a total length "L", which in this specific instance is approximately 237 mm and the center portion 28 has a length L' in the range of about 35% to about 65% of said total length "L". Preferably the center portion 28 has a length of about 50% of said total length "L". The first and second end portions 24 and 26 of the bushing 10 are of substantially the same length "H".

The outer peripheral ends of the bushing 10 are turned down to provide a pair of narrow outer end portions 32 and 34 whereby the bushing may be press fitted into lugs provided on the ends of the track links (not shown).

Preferably, the bushings 10 are manufactured from hot rolled barstock. The barstock is saw cut into individual lengths slightly longer than the bushings whereupon they are machined. The raw steel material used in the production of the track bushing 10 of the present invention may, for example, be a plain carbon steel with a composition meeting the specification of S.A.E. 1060 which can be direct hardened.

The bushings 10 which have been rough machined to shape, in a conventional manner, are subjected to selective heat treatment consisting of, for example, first pushing the bushings, one at a time, through an induction coils which will heat the bushings to an austenitizing temperature of approximately 1540 degrees F. It is recognized that the bushing 10 could also be heated in a furnace. A water quench is then applied to the outer peripheral surface 12, the pair of radial end surfaces 14 and 16, and the first and second end portions 24 and 26. The center portion 28 of the inner peripheral surface 20 is protected from the quench. It is recognized that other quench media could be employed such as, soluble oil and polymer quenchants. The quench produces a hardness thickness or portion 38 in the bushing 10 adjacent the outer peripheral surface 12, the pair of radial end surfaces 14 and 16, and the first and second end portions 24 and 26. A core portion of the bushing 10, indicated at 40, is enclosed by the hardened portion 38. The hardness portion 38 is preferably approximately 2.0 to 10.0 Mm thick adjacent the outer peripheral surface 12 and the first and second end portions 24 and 26. The outer peripheral surface 12 has a Rockwell C hardness in the range of about 57 to about 62, the inner peripheral surface 20 has a Rockwell C hardness on the first and second end portions 24 and 26 in the range of about 57 to about 62 and a Rockwell C hardness on the center portion 28 in the range of about 15 to about 50. Preferably, the outer peripheral surface 12 and the inner peripheral surfaces 20 of the first and second end portions 24 and 26 are of substantially the same Rockwell C hardness. The outer peripheral surface 12 of the bushing 10 and the first and second end portions 24 and 26, each have a Rockwell C hardness of about 60 and the middle portion of the center portion has a Rockwell C hardness of about 32.

INDUSTRIAL APPLICABILITY

Due to the conditions under which a track bushing 10 must operate, it has been found to be advantageous to provide a hardened portion 38 which will resist wear about a softer, more ductile core portion 40 which will resist shock and crack propagation. The direct harden selective quench process consists of, for example, heating the bushing 10 to the austenitizing temperature, typically about 1540 F, and quenching the outer peripheral surface 12, the radial end surfaces 14 and 16, and the first and second end portions 24 and 26 which are in contact with the track pin (not shown). This is accomplished by selectively quenching the bushing 10.

To prevent quenching in the center portion 28 of the second peripheral surface 20 a pair of plugs (not shown) are inserted in the bore 18 of the bushing 10 preventing the quench media from reaching the center portion. In addition to being selective, the quench must also have sufficient drasticity to provide a martenstitic microstructure in the quenched sections. In the preferred embodiment the hardness and the hardness depth are functions of the material used to make the bushing. The carbon level of the material is selected to control the hardness and the hardenability is specified and restricted to a somewhat narrow range to control the hardened depth.

In view of the foregoing, it can be appreciated that the track bushing has both improved wearlife and strength.

Other aspects, objects, and advantages of this invention can be obtained from a study of the drawings, the disclosure, and the appended claims.

I claim:

1. In a track bushing for track of a work vehicle, the bushing having an outer peripheral surface and an inner peripheral surfaces, first and second end portions and a center portion, and a bore opening on each end, the improvement comprising:
    the outer peripheral surface having a Rockwell C hardness in the range of about 57 to about 62;
    the inner peripheral surface having a Rockwell C hardness on the first and second end portions in the range of about 57 to about 62 and a Rockwell C hardness on the inner center portion in the range of about 15 to about 50.

2. The track bushing, as set forth in claim 1, wherein the outer peripheral surface and the inner peripheral surfaces of the first and second inner end portions are of substantially the same Rockwell C hardness.

3. The track bushing, as set forth in claim 1, wherein the bushing has a total length "L" and the center portion has a length L' in the range of about 35% to about 65% of the total length "L".

4. The track bushing, as set forth in claim 3, wherein the center portion has a length of about 50 of said total length "L".

5. The track bushing, as set forth in claim 3, wherein the first and second end portions of the bushing are of substantially the same length.

6. The track bushing, as set forth in claim 1, wherein the outer peripheral surface of the bushing and the first and second end portions each have a Rockwell C hardness of about 60 and the middle portion of the center portion has a Rockwell C hardness of about 32.

* * * * *